United States Patent [19]

Wright

[11] 3,855,921

[45] Dec. 24, 1974

[54] ADJUSTABLE U-SHAPE SAFETY DIE BLOCK

[75] Inventor: James T. Wright, Grosse Point Shores, Mich.

[73] Assignee: Carlson-Dimond & Wright, Inc., Warren, Mich.

[22] Filed: Nov. 2, 1973

[21] Appl. No.: 412,150

[52] U.S. Cl............... 100/53, 192/131 R, 425/153
[51] Int. Cl............................................ B30b 15/08
[58] Field of Search.............. 83/526, 545, DIG. 45; 248/351, 354 R; 192/116.5, 129, 130, 131 R; 100/53; 425/151, 153, DIG. 45

[56] References Cited
UNITED STATES PATENTS

| | | | |
|---|---|---|---|
| 2,240,630 | 5/1941 | Stacy.............................. | 192/131 R |
| 2,946,277 | 7/1960 | Archer................................ | 100/53 |
| 2,990,578 | 7/1961 | Adair et al........................ | 100/53 X |
| 3,023,457 | 3/1962 | Sunday........................ | 425/DIG. 45 |
| 3,541,950 | 11/1970 | Anderson........................... | 100/53 |
| 3,650,650 | 3/1972 | Cook .................................. | 425/153 |
| 3,735,842 | 5/1973 | Spanke...................... | 248/354 R X |

FOREIGN PATENTS OR APPLICATIONS

| | | | |
|---|---|---|---|
| 1,232,693 | 10/1960 | France................................ | 100/53 |
| 1,100,940 | 3/1961 | Germany............................ | 425/151 |

Primary Examiner—Billy J. Wilhite

[57] ABSTRACT

A safety die block of metal, suitable plastic materials of high compression values, or combinations of these materials, in a U-shape design, is made of a plurality of segmental layers having a common axis of rotation, arranged in a stack one upon another or in partially offset relationship upon their common axis, whereby the segmental layers can be compactly organized, reorganized and secured together into a die block of lesser height or length from one of a greater height or length. The U-shape segmental layer is provided with a pivot section of reduced thickness disposed substantially medially of the vertical dimension of the layer. The segmental layers are arranged with grooves on their bottom surfaces and complementary vertically aligned ribs on their top surfaces, in register with the grooves, for locating and maintaining aligned segmental layers in a load bearing stack. When segmental layers are pivoted out of such stack and offset from aligned relationship, the overall height of the stack of layers forming the die block is reduced. The pivot section of the segmental layer has a thickness such that no load is carried by the offset segmental layer when it is at rest upon the pivot section of the segmental layer next adjacent thereto and the die block is in compression.

27 Claims, 11 Drawing Figures

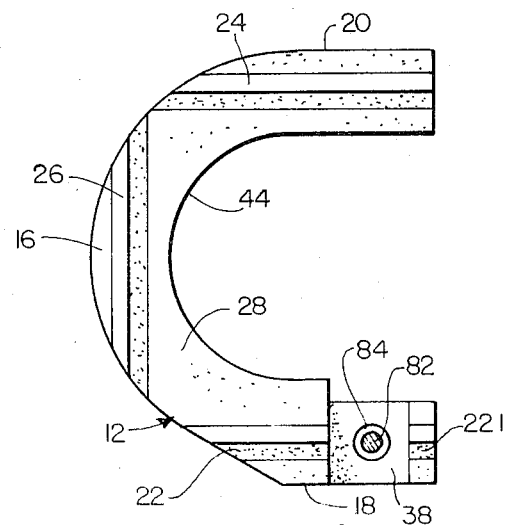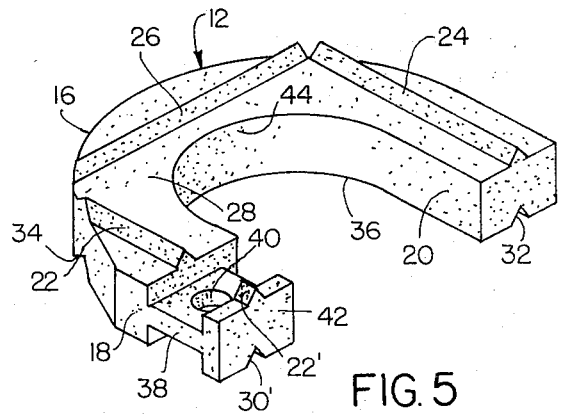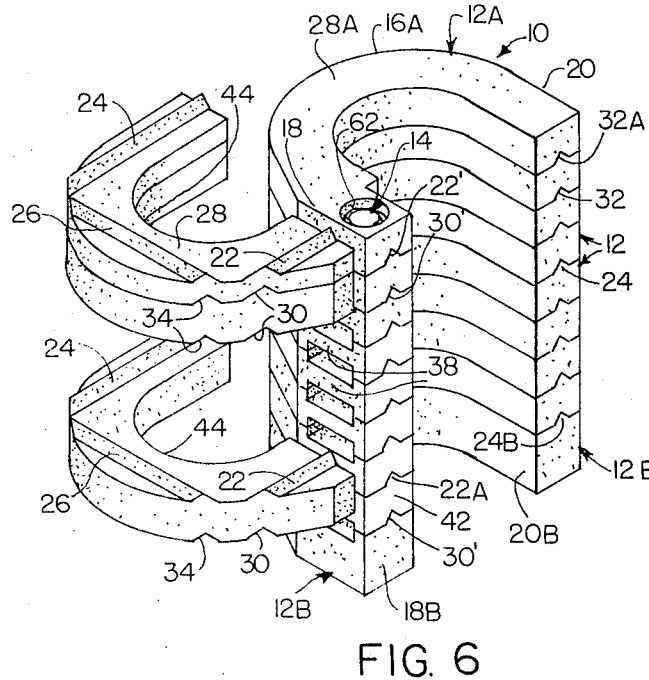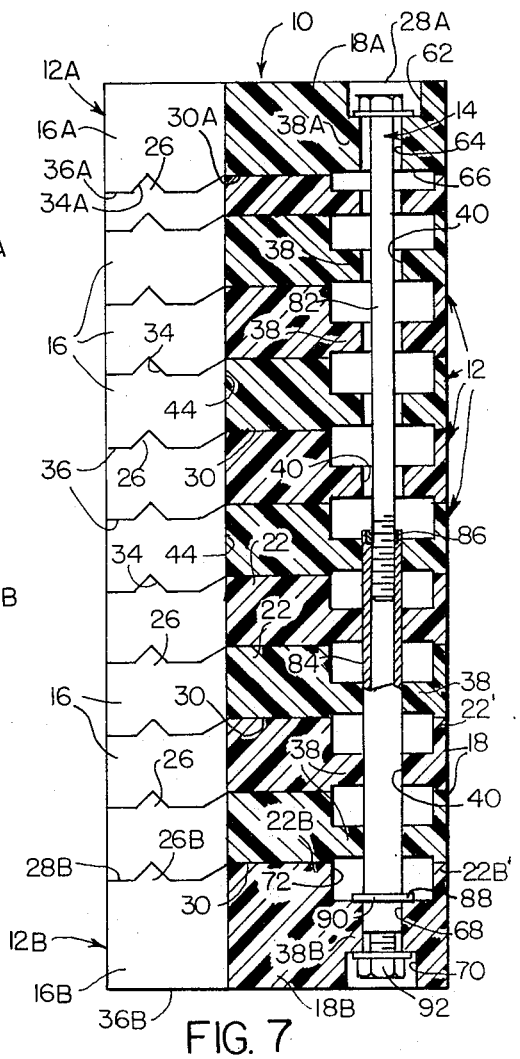

PATENTED DEC 24 1974 3,855,921

ADJUSTABLE U-SHAPE SAFETY DIE BLOCK

The invention pertains to and involves the construction of an adjustable safety die block designed for use on press slide posts in the open area of inclined presses between the die bed or die plate and the upper movable die plate or platen of the press, to provide a member therebetween which will prevent inadvertent or accidental lowering of the platen or upper die section toward the die bed with consequent damage to tools and dies, to the press, or to personnel having their hands or other body portions in the region between the platen and the die bed. The use of safety die blocks of U-shape design made of metal for this purpose has long been known and practiced in the press art. These safety die blocks are usually made of a relatively light weight metal such as magnesium, aluminum, or special light weight alloys of magnesium and/or aluminum or other metals. Safety die blocks generally range in size from about 4, 5 or 6 inches to as much as 12, 18, 24 or more inches in length, standard lengths generally falling into the range of 12 to 24 inches. Safety die blocks are generally used and usually required when tooling in the press is to be inserted, changed, modified or corrected. Safety precautions call for shutting off the elctrical power to the press to prevent its accidental or inadvertent operation, the insertion of the safety die block upon and at least partially about an inclined post of the press between the platen and the die bed on which the die block rests, and careful removal and insertion of tooling from and into the die holders.

A principal difficulty in connection with safety die blocks heretofore and currently available has been the requirement for carrying a substantial number of die blocks, each one of a specific length to accommodate a wide number of openings in the presses. It has been found that many of these members, which serve no other useful press purpose, are generally subject to abuse, being mislaid, and severance into reduced lengths when press maintenance personnel cannot locate a safety die block of the then-desired length. The result is that when a maintenance man is looking for a safety die block, he usually experiences some difficulty in locating one of the particular length that he then requires. It is not surprising, therefore, that safety die blocks are generally abused. Press departments, particularly where large numbers of presses are in operation, usually lack for light weight safety die blocks. The need therefore is for a safety die block that is adjustable. It will, of course, be recognized by persons skilled in the art to which the invention pertains that adjustability has no particular significance if in adjustment, compressive load requirements cannot be met. The safety die block of this invention provides means for supporting compressive loads when the die block is either in full length alignment or in adjusted or shortened lengths.

BRIEF DESCRIPTION OF THE INVENTION

Preferred forms of an adjustable safety die block embodying the invention each comprises a plurality of stacked integrally formed segmental layers or members of U-shaped design. The U-shaped body of the segmental layer is substantially planar and comprises an intermediate web section disposed between and connected to the proximal ends of substantially parallel legs of substantially equal length. In one form of the die block, one leg of the segmental layer is provided with a pivot section adjacent but spaced from the distal end of the leg and adapted to receive and pass therethrough a locking tube and screw assembly for maintaining the stacked segmental layers in extended or compacted load-bearing alignment. In another form of the invention, the pivot section is at the corner of a square form web and leg juncture, wherein the segmental layer has a substantially rectilinear outer perimetric configuration and the inner perimeter has an arcuate form adapted to at least partially encircle the press slide post to which the die block will be applied. Self-aligning featrures such as complementary ribs and grooves can be embodied in the segmental layers, or the web and legs of each segmental layer can have complementary convexly curved upper and concavely curved lower surfaces, so that the web and leg sections of each segmental layer will make substantially complete surface contact with next adjacent aligned upper and/or lower segmental layers in the load bearing stack.

When each segmental layer is in fully aligned relationship with every other segmental layer of the die block, it attains its maximum extended height or length. When one or more segmental layers are rotated about the screw and tube assembly into offset relationship with adjacent segmental layers, the safety die block is adjusted to a reduced height or length. The telescoping center tube and screw assembly is threadedly adjustable to secure the segmental layers in their fully aligned extended or in any compacted relationship.

The die block segmental layers of this invention can be made of a variety of metals, preferably those which are of light weight and high compressive strength, among which are included the light weight magnesium alloys, light weight aluminum alloys, and other similar materials. In addition, the segmental layers can be made of some plastic materials including nylon plastic reinforced with short glass fibers (such as Du Pont's Zytel materials), and other equivalent plastic materials having substantially high compressive strength and light weight.

It is therefore an object of the invention to provide an adjustable safety die block in the form of a plurality of segmental layers of U-shape design which are secured together at a pivot section of the segmental layers for rotation thereabout. Another object is to provide a stack of segmental layers that is capable of being reduced in overall height or length by pivoting one or more of the segmental layers out of aligned relationship so as to compact the next adjacent aligned layers into a load-bearing stack of reduced length. A further object is to provide safety die block segmental layers having a U-shaped design comprising a web portion and legs extending therefrom, which are rotatable about a pivoting axis with respect to next adjacent segmental layers. A further object is to provide segmental layers which can be made of light weight metal or plastic materials having high compressive strength. Still another object is to provide segmental layers having complementary features effecting load-bearing alignment registration with next adjacent layers. Yet a further object is to provide an adjustable safety die block comprised of a plurality of discrete stackable segmental layers which can be molded or cast of relatively light weight metallic or plastic materials of high compressive strength, economically feasible and competitive, and practical for use as a piece of safety die block equipment for inclined presses.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of the die bed and platen of an inclined press having a die bed and upper tooling secured thereto, with a representative example of the U-shaped adjustable safety die block of this invention disposed about one of the inclined press slide posts.

FIG. 4 is a top plan view of a segmental layer.

FIG. 5 is a perspective view of the segmental layer illustrated in FIG. 4.

FIG. 6 is a perspective view of the die block illustrated in FIG. 2 arranged with some segmental layers rotated out of the aligned stack in order to compact the remaining aligned segmental layers into a stack of reduced height.

FIG. 7 is a vertical sectional view taken substantially on the line 7—7 of FIG. 3, more clearly illustrating the screw and tube assembly securing the stack of segmental layers into the adjustable safety die block of this invention.

Figure 1:
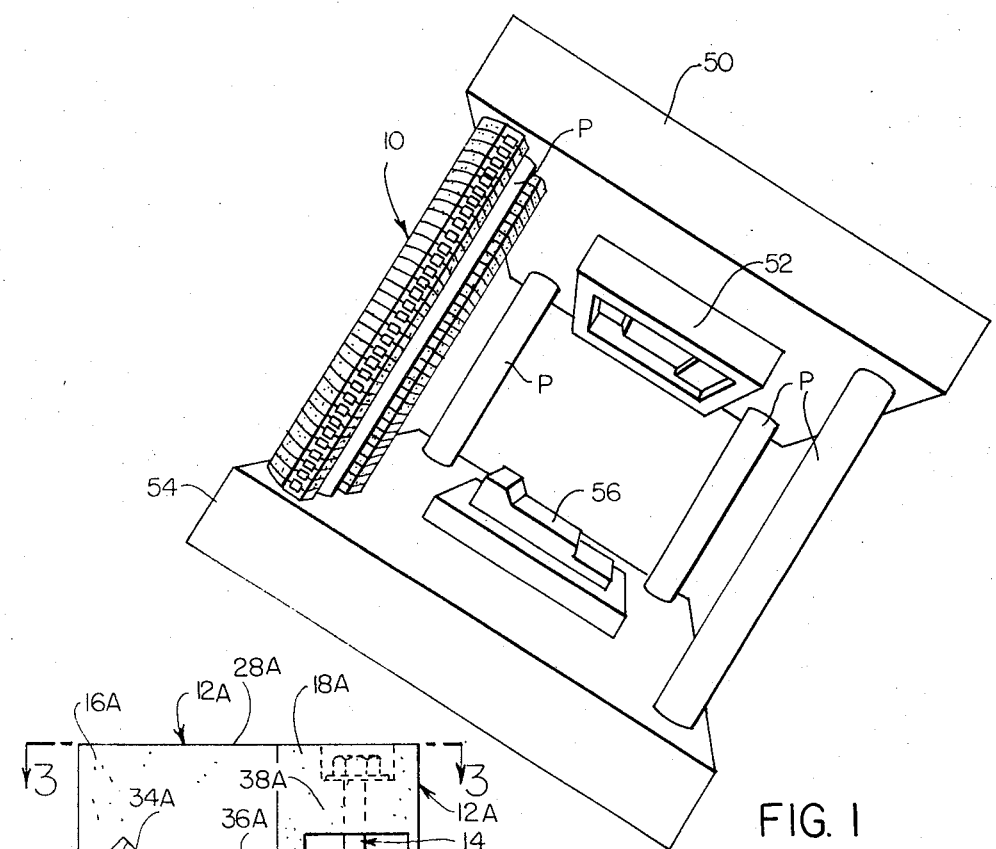

As illustrated in the several views of the drawings and particularly in FIGS. 1 through 7 inclusive, the adjustable safety die block 10 comprises a plurality of segmental layers 12 normally arranged in stacked aligned relationship one above the other and secured together by the screw and tube assembly 14 in either the aligned stacked (FIGS. 2 and 7) or their compacted (FIG. 6) relationships, or any intermediate compacted relationship produced by rotating one or more of the segmental layers 12 into offset relationship with next adjacent layers.

As illustrated particularly in FIGS. 4 and 5, the segmental layers 12 of the adjustable safety die block 10 each comprises a web section 16 of arcuate form and a pair of substantially parallel leg sections 18, 20 extending from each end of the arcuate web section 16. To provide means for maintaining the segmental layers 12 in stacked vertical alignment one above the other, the layers 12 have ribs 22 and 24 extending substantially longitudinally and medially of the legs 18 and 20 respectively, and a rib 26 extending substantially transversely of the web section 16, on their upper surface 28, and radial grooves 30, 32 and 34 on the bottom surface 36 of the segmental layers 12 in register with the ribs 22, 24 and 26 respectively. The grooves 30, 32 and 34 are of the dimensions complementary with the ribs 22, 24 and 26 so that the ribs of the segmental layers 12 will rest within the grooves of the layers 12 next thereto above, when the layers are stacked in alignment. However, ribs 22, 24 and 26 are not formed on the top surface 28 of the topmost segmental layer 12a, nor are the grooves 30, 32 and 34 formed in the bottom surface 36 of the lowermost segmental layer 12b.

The segmental layers 12 are further provided with pivot sections 38 of reduced thickness lying substantially intermediate and relatively central and medially between the upper and lower surfaces 28 and 36 respectively of the leg 18. The selection of either leg 18 or 20 for pivoting the layers 12 is of course optional. The thickness of the pivot sections 38 is preferably less than one-half the vertical height of the leg 18 not including the height of the rib 22. An opening 40 is provided substantially central and transversely through the pivot section 38 to pass and closely receive therethrough the screw and tube assembly 14. The pivot section 38 is relatively adjacent but spaced from the distal end portion 42 of the leg 18 which is provided with a segment 22' of the rib 22 and a segment portion 30' of the groove 30. The location of the pivot section 38 on the leg 18 is optional. It may be at the distal end of the leg or substantially at any intermediate position between the web section 16 and the distal end.

Web section 16 is arcuately formed and is provided with a concavely curved inner surface 44 of a radius that substantially corresponds to the curvature of the inclined post of a press, so that as illustrated in FIG. 1, the adjustable safety die block 10 will rest upon the slide post P, or any of the slide posts of the press under the platen 50 holding the upper die set 52, and will rest upon the die bed 54 supporting the lower die set 56. The legs 18 and 20 extend about the post P to secure the die block thereon.

The topmost segmental layer 12a comprises the web section 16a and the lateral substantially parallel legs 18a and 20a extending therefrom. Although there are no ribs provided on the upper flat planar surface 28a of the layer 12a, there are grooves 30, 30', 32, and 34 in the bottom surface 36a of the legs 18a, 20a and the web section 16a respectively. The pivot section 38a of the leg 18a is provided with a substantially central transverse bore 64 axially aligned and in register with the bores 40 of the segmental layers 12 therebelow, for passage therethrough of the screw and tube assembly 14. The groove 30' is disposed in the distal portion beyond the pivot section 38a in alignment with the groove 30.

The lowermost segmental layer 12b comprises a web section 16b with lateral substantially parallel legs 18b and 20b extending therefrom, a flat planar bottom surface 36b free of grooves and an upper surface 28b having ribs 22b, 22b', 24b and 26b provided in the legs 18b, 20b and the web section 16b respectively, for registration in the complementary grooves 30, 30', 32 and 34 of the segmental layer 12 next thereto above. The bottommost segmental layer 12b is further provided with a pivot section 38b having a bore 68 disposed substantially central and transversely of the pivot section 38b, and in axial alignment and registration with the bores 40 of the segmental layers 12 thereabove for passage therethrough of the screw and tube assembly 14. The pivot section 38b is further provided with a counterbore 70 on its lower side and a slot 72 on its upper side adapted to receive the pivot section 38 of the segmental layer 12 next thereto immediately above when rotated into offset relationship with the bottommost segmental layer 12b.

Figure 2:
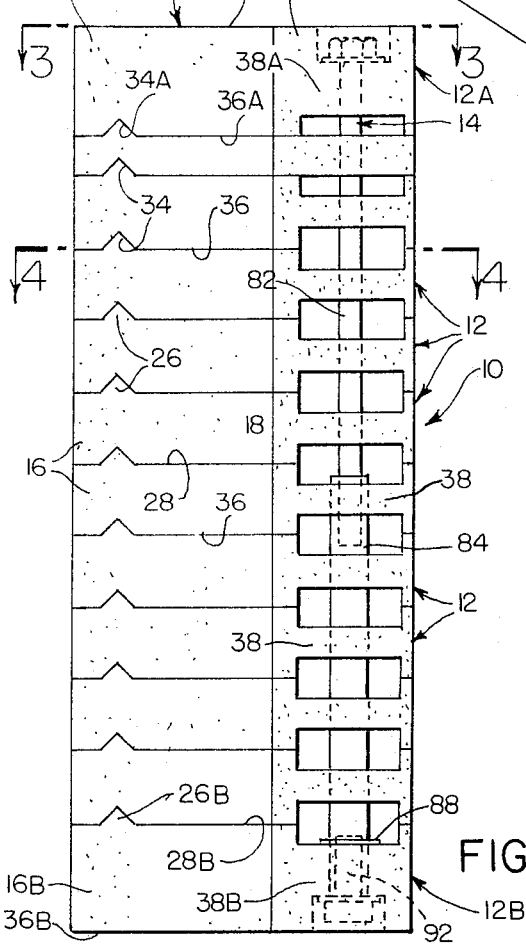
FIG. 2 is an elevational view taken substantially on the line 2—2 of FIG. 3 illustrating a stack of segmental layers arranged in an extended full length adjustable safety die block of this invention.
Figure 3:
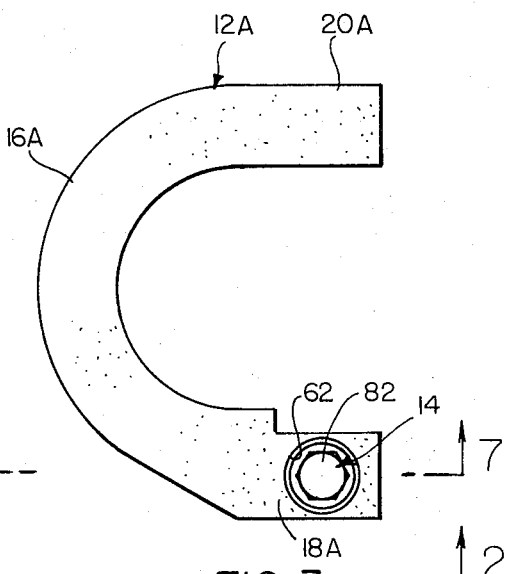
FIG. 3 is a top plan view taken substantially on the line 3—3 of FIG. 2.
Figure 8:
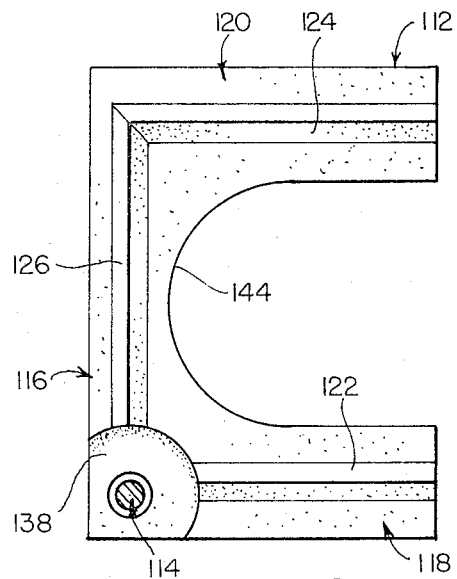
FIG. 8 is a plan view, similar to FIG. 4, of a modified form of a segmental layer.
Figure 9:
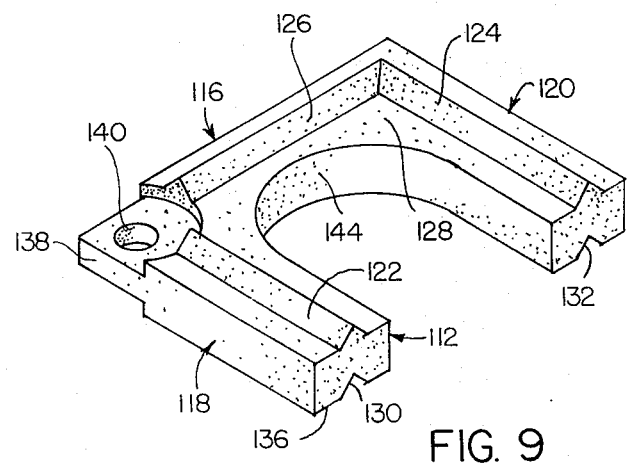
FIG. 9 is a perspective view of the segmental layer illustrated in FIG. 8.
Figure 10:
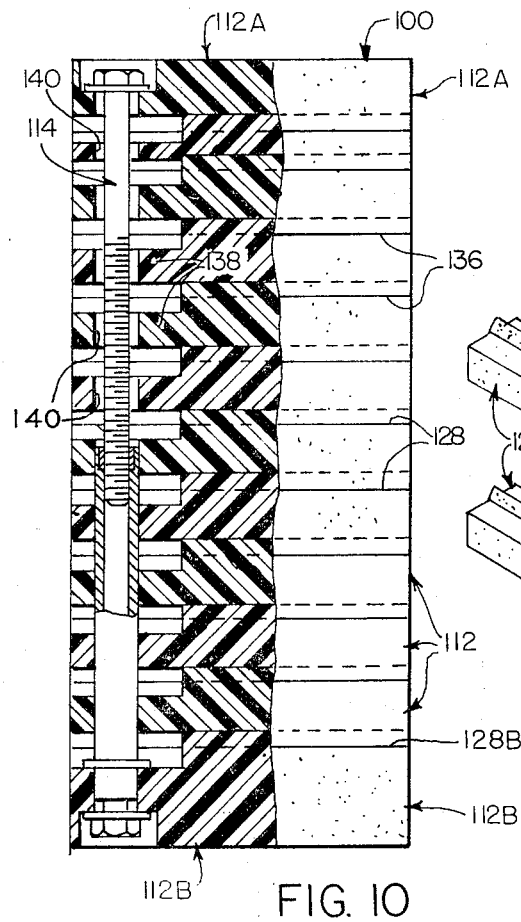
FIG. 10 is an elevational view partially in vertical section, similar to FIG. 7, of a stack of the modified segmental layers illustrated in FIGS. 8 and 9, showing the screw and tube assembly securing the stack of layers into an adjustable safety die block.

The screw and tube assembly 14 comprises a headed screw 82 which may be flanged under the head or provided with a washer adapted to rest upon the pivot section 38a in the counterbore 62 of the topmost segmental layer 12a, a tube 84 provided with a threaded adapter 86 affixed and secured to the distal end of the tube 86, a retaining or C-ring 88 secured in an annular groove 90 in the outer surface of the tube 84 adjacent its proximal end and adapted to rest upon the pivot section 38b of the bottommost segmental layer 12b in the slot 72, and a headed screw 92 threadedly engaged with the tube 84 and provided with a flange under the head or a washer which bears upon the pivot section 38b in the counterbore 70 of the bottommost segmentat layer 12b. The screw 82 is of a length at least sufficient to threadedly engage the adapter 86 on the tube 84 when all of the segmental layers 12, 12a and 12b are arranged in stacked alignment one upon the other into the fully extended height adjustable safety die block 10, as illustrated in FIGS. 1, 2 and 7.

In operation, to obtain the full height or length arrangement of the adjustable safety die block 10 the segmental layers 12, 12a and 12b, by their respective web sections and legs, are disposed in alignment one above the other until the full stack is formed, the threaded screw 82 being advanced through adapter 86 into the tube 84 until the head of the screw firmly bears upon the pivot section 38a of the topmost segmental layer 12a and the head of the screw 92 firmly bears upon the pivot section 38b of the bottommost segmental layer 12b, drawing all of the segmental layers firmly together with their ribs seated in grooves of the next adjacent segmental layer thereabove. In such fully stacked arrangement, the adjustable safety die block 10 is ready for use on the slide post P of the press, as illustrated in FIG. 1, the web sections 16, 16a and 16b resting thereon, and their legs disposed about the lateral sides of the slide post P.

To compact the adjustable safety die block to a lesser height or length, the screw 82 is backed off from the threaded adapter 86 until one or more of the segmental layers 12 can be raised from the segmental layers next adjacent therebelow, which are to remain in a load-bearing stack, and rotated about the screw and tube assembly 14 into offset relationship, substantially in the posture illustrated in FIG. 6, wherein their pivot sections 38 rest upon the pivot sections 38 of next adjacent stacked segmental layers 12 and 12b therebelow. Pivot sections 38 in legs 18 are so designed in thickness and posture that the pivot sections 38 of the offset segmental layers will not bear any part of the load applied to the stacked aligned segmental layers when the latter are placed in compression. As described above, this design involves forming the pivot sections substantially medially of the height of the leg and of a thickness somewhat less than one-half the height of the leg.

It will therefore be recognized that the assembled stack 10 of segmental layers can be arranged in a variety of heights or lengths, and that each particular stack of aligned segmental layers 12a, 12 and 12b carries compressive load applied thereto while the offset segmental layers 12 bear no load.

A slightly modified form of the adjustable safety die block 10 is illustrated in FIGS. 8–11 inclusive. In this modification, the full height adjustable safety die block 100 comprises a plurality of segmental layers 112 arranged in aligned relationship one above the other and capped at their upper and lower ends with a topmost segmental layer 112a and a bottommost segmental layer 112b. This stack of segmental layers is secured together by a screw and tube assembly 114 substantially identical to the screw and tube assembly 14 in the die block 10 described hereinabove.

The segmental layers 112, 112a and 112b are substantially the same as the segmental layers 12, 12a and 12b respectively except that the web sections 116, 116a and 116b and their conjoined substantially parallel legs 118, 118a, 118b and 120, 120a, 120b respectively extending therefrom have a rectilinear outer perimetric configuration, the web sections 116, 116a, 116b having a concavely curved inner perimetric surface 144, 144a, 114b respectively corresponding substantially to the inner arcuate surface 44 of the segmental layer 12. This outer rectilinear configuration of the segmental layers permits placement of the pivot section 138 at a corner of the segmental layer formed by the web section 116 and the leg 118 or 120. Pivot section 138 corresponds substantially to pivot section 38 of the segmental layers 12 described above, and is provided with a substantially central transverse bore 140 therethrough adapted to receive and pass the screw and tube assembly 114. Further similarity of the segmental layers 112 includes the provision on their upper surfaces 128 of ribs 122, 124 on legs 118, 120 respectively and rib 126 on web section 116, and complementary grooves 130, 132 and 134 on their bottom surfaces 136.

Similar to pivot section 38 in the segmental layers 12, the pivot section 138 is disposed substantially medially of the height of the segmental layer 112 and of a thickness somewhat less than one-half the height of the segmental layer, at one of the corners formed by the web section 116 and the leg 118 or 120.

The several component elements of the topmost and bottommost segmental layers 112a and 112b correspond substantially to the corresponding elements of the segmental layers 12a and 12b, except that the outer configuration of these top and bottommost segmental layers is rectilinear, corresponding to the segmental layers 112, and their pivot sections are at a corner of the web section and a leg and in axial alignment and registration with the corresponding pivot sections 138 of segmental layers 112 therebetween.

Figure 11:
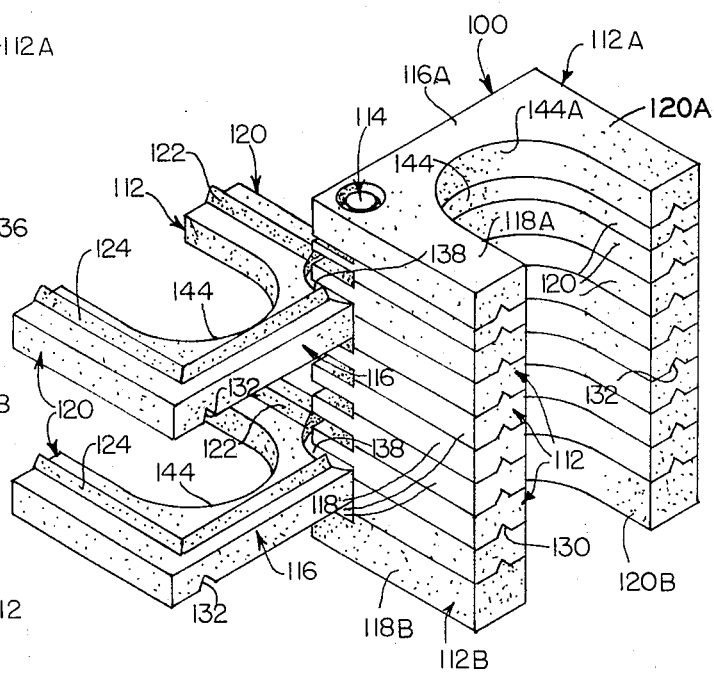
FIG. 11 is a perspective view of the die block illustrated in FIG. 10, arranged with some segmental layers rotated out of the aligned stack in order to compact the remaining aligned segmental layers into a stack of reduced height.

Operation of the adjustable safety die block 100 is substantially the same as that described above for the die block 10. The screw of the assembly 114 is threadedly retracted from firm engagement upon the topmost segmental layer 112a until that layer can be raised and one or more intermediate segmental layers 112 freely rotated about the screw and tube assembly 114 into offset relationship with respect to next adjacent segmental layers therebelow, substantially is illustrated in FIG. 11. When the pivot sections 138 of offset segmental layers is at rest upon the pivot section of a stacked aligned segmental layer therebelow, the screw of the screw and tube assembly 114 is threaded inwardly of the tube to firmly engage and bear upon the pivot section of the topmost segmental layer 112a until the aligned segmental layers are drawn into firm load-bearing aligned relationship and into a compacted stack of lesser height.

Commercial fabrication of the adjustable safety die block can be made with segmental layers of varying thicknesses, as will readily be observed. However, a preferred but not necessarily the only commercial fabrication of the adjustable safety die blocks 10 or 100 employs segmental layers 12 and 112 of 1 inch or ½ inch axial thickness or height, excluding the height of the ribs on their upper surfaces, and the thickness of the topmost and bottommost layers at approximately 1 and ½ inch. By utilizing one of the segmental layers 12 and 112 at ½ inch in thickness and the remaining segmental layers 12 and 112 at 1 inch in thickness, the overall height in fully extended or compacted relationship can be arranged at ½ inch increments. It will of course be understood that these dimensional references to a commercial product are merely representative of the height variability that can be built into the die blocks 10 and 100 formed of these segmental layers, making the adjustable safety die block of this invention as flexible as possible for the benefit of press operators, millwrights, and other personnel requiring the safety features of a die block.

The segmental layers of the adjustable safety die blocks 10 and 100 can be made of machinable or moldable metals such as the aluminum alloy 356-T6, magnesium alloys or the like, high in compressive strength. Or, machinable or moldable plastic materials of high compressive strength, such as DuPont's ZYTEL, a nylon material reinforced with short glass fibers, can also be used for the various segmental layers disclosed hereinabove.

Although particular embodiments of the invention have been disclosed herein for purposes of explanation, further modifications of variations thereof, after study of this specification, will or may become apparent to those skilled in the art to which the invention pertains. Reference should be had to the appended claims in determining the scope of the invention.

I claim:

1. In an adjustable safety die block of substantially U-shape design for use on an inclined press post, the improved combination comprising
a plurality of segmental layers of substantially U-shape design and means securing said segmental layers through a portion thereof in a parallel series forming a vertical stack,
at least some of said segmental layers being rotatable about said securing means for offset relationship to next adjacent segmental layers,
said next adjacent segmental layers being aligned one upon the other in contiguous load-bearing relationship,
said offset segmental layers being disposed upon said next adjacent segmental layers in non-load bearing relationship.

2. The structure defined in claim 1, wnerein said segmental layers are made of a high compression strength relatively light weight metallic material.

3. The structure defined in claim 2, wherein said metallic material is an aluminum alloy.

4. The structure defined in claim 2, wherein said metallic material is a magnesium alloy.

5. The structure defined in claim 1, wherein said segmental layers are made of a high compression strength relatively light weight plastic material.

6. The structure defined in claim 5, wherein said plastic material is a nylon reinforced with glass fibers.

7. The structure defined in claim 1, wherein each said U-shape segmental layer comprises a web section of arcuate form,
and a pair of legs extending from said web section in a substantially parallel spaced apart attitude,
said web section having a concavely curved inner surface adapted to at least partially encircle said inclined press post.

8. The structure defined in claim 7, wherein said web section has a convexly curved outer perimetric surface substantially concentric with said concavely curved inner surface.

9. The structure defined in claim 7, wherein said web section and said legs form a rectilinear outer perimetric surface opposite said concavely curved inner surface.

10. The structure defined in claim 7, wherein said securing means provides a common axis of rotation for said segmental layers.

11. The structure defined in claim 7, wherein said segmental layers when arranged in stacked overlying aligned relationship form a safety die block of fully extended height,
and when said stack is arranged with some segmental layers in offset relationship, the remaining segmental layers in stacked overlying aligned relationship form a safety die block or reduced height.

12. The structure defined in claim 7, wherein said web section and legs of the segmental layers intermediate the topmost and bottommost segmental layers are provided with ribs on their upper surfaces and complementary vertically aligned grooves on their bottom surfaces, to maintain said segmental layers overlying aligned load bearing relationship.

13. The structure defined in claim 12, wherein said web section and legs of said topmost segmental layer are provided with grooves on their bottom surfaces in vertical alignment with and complementary to the ribs on the upper surfaces of said web section and legs of the segmental layer next adjacent therebelow,
and said web section and legs of said bottommost segmental layer are provided with ribs on their upper surfaces in vertical alignment with and complementary to the grooves on the bottom surfaces of said web section and legs of the segmental layer next adjacent thereabove.

14. The structure defined in claim 12, wherein the thickness of said intermediate segmental layers is substantially equal,
and the thickness of said topmost and bottommost segmental layers is at variance with said first-mentioned thickness.

15. The structure defined in claim 7, wherein one said leg is provided with a pivot section adjacent the distal end of said leg,
said pivot section having a bore central and transversely therethrough to receive and pass said said securing means.

16. The structure defined in claim 15, wherein said pivot section is spaced apart from the distal end of said leg.

17. The structure defined in claim 15, wherein said pivot section has a thickness less than one-half the height of said segmental layer not including said ribs extending upwardly from its upper surface, said pivot section is posited medially the height of said leg, whereby when one said segmental layer is rotated into offset relationship with respect to its next adjacent segmental layer therebelow, said offset segmental layer bears no load when a stack of aligned segmental layers in registration with each other is placed in compression.

18. The structure defined in claim 15, wherein
said pivot section is rectilinear in form to prevent further rotation of an offset segmental layer having its pivot section at rest upon the pivot section of a next adjacent segmental layer arranged in stacked aligned load bearing relationship.

19. The structure defined in claim 1, wherein
each said U-shape segmental layer comprises a web section having an inner concavely curved surface and a rectilinear outer surface opposite said inner concavely curved surface, and a pair of legs extending from said web section in a substantially parallel spaced apart attitude, said inner concavely curved surface adapted to at least partially encircle said inclined press post.

20. The structure defined in claim 19, wherein
said web section and legs of the segmental layers intermediate the topmost and bottommost segmental layers are provided with ribs on their upper surfaces and complementary vertically aligned grooves on their bottom surfaces, to maintain said segmental layers in overlying aligned load bearing relationship.

21. The structure defined in claim 20, wherein
said web section and legs of said topmost segmental layer are provided with grooves on their bottom surfaces in vertical alignment with and complementary to the ribs on the upper surfaces of said web section and legs of the segmental layer next adjacent therebelow, and said web section and legs of said bottommost segmental layer are provided with ribs on their upper surfaces in vertical alignment with and complementary to the grooves on the bottom surfaces of said web section and legs of the segmental layer next adjacent thereabove.

22. The structure defined in claim 19, wherein
each said leg forms a corner with said web section, and a pivot section in one said corner, said pivot section having a bore central and transversely therethrough to receive and pass said securing means.

23. The structure defined in claim 22, wherein
said pivot section has a thickness less than one-half the height of said segmental layer not including said ribs extending upwardly from its upper surface, said pivot section is posited medially the height of said corner, whereby when one said segmental layer is rotated into offset relationship with respect to its next adjacent segmental layer therebelow, said offset segmental layer bears no load when a stack of aligned segmental layers in registration with each other is placed in compression.

24. The structure defined in claim 22, wherein
said pivot section is substantially circular in form, permitting limited rotation of an offset segmental layer having its pivot section at rest upon the pivot section of a next adjacent segmental layer arranged in stacked aligned load bearing relationship.

25. The structure defined in claim 1, wherein
said segmental layer securing means comprises a telescoping screw and tube assembly, said assembly securing said segmental layers in their full height aligned overlying stacked relationship, and alternatively in a compacted, partially stacked and partially offset relationship of reduced height, the ends of said assembly, securing said segmental layers in either posture, being adjustable within the outer longitudinal limits of said die block.

26. The structure defined in claim 25, wherein
said screw and tube assembly comprises a screw and a tube, said tube having a threaded adapter at its proximal end to threadedly receive and engage said screw therein, means securing said tube against axial displacement to at least one segmental layer at its distal end.

27. The structure defined in claim 26, wherein
said tube is cylindrical, and means securing said tube to the bottommost segmental layer comprising a C-ring disposed above said bottommost layer and affixed to said tube, and a threaded fastener engaging said tube and said bottommost segmental layer.

* * * * *